US009613134B2

(12) United States Patent
Hu et al.

(10) Patent No.: US 9,613,134 B2
(45) Date of Patent: Apr. 4, 2017

(54) IDENTIFYING MATHEMATICAL OPERATORS IN NATURAL LANGUAGE TEXT FOR KNOWLEDGE-BASED MATCHING

(71) Applicant: Microsoft Corporation, Redmond, WA (US)

(72) Inventors: Luhui Hu, Bellevue, WA (US); Navendu Jain, Seattle, WA (US); Liyuan Zhang, Redmond, WA (US); Rahul Potharaju, West Lafayette, IN (US); Vitaly Voloshin, Sammamish, WA (US); Mingshi Wang, Bellevue, WA (US); Joseph K.W. Chan, Redmond, WA (US); Laura M Cruz, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 241 days.

(21) Appl. No.: 14/479,363

(22) Filed: Sep. 7, 2014

(65) Prior Publication Data
US 2016/0070784 A1 Mar. 10, 2016

(51) Int. Cl.
*G06F 17/30* (2006.01)
*G06F 11/30* (2006.01)

(52) U.S. Cl.
CPC .... *G06F 17/30684* (2013.01); *G06F 11/3003* (2013.01); *G06F 17/30011* (2013.01); *G06F 17/3061* (2013.01); *G06F 17/30616* (2013.01)

(58) Field of Classification Search
CPC .......... G06F 17/30011; G06F 17/3061; G06F 17/30616; G06F 17/30684; G06F 17/30
USPC .................................................. 707/600–899
See application file for complete search history.

(56) References Cited

U.S. PATENT DOCUMENTS

2008/0162474 A1* 7/2008 Thong ............... G06F 17/30011

* cited by examiner

*Primary Examiner* — Isaac M Woo
(74) *Attorney, Agent, or Firm* — International IP Law Group, PLLC

(57) ABSTRACT

Disclosed herein is a system and method for taking a snapshot or input from a source and identifying appropriate documents in a knowledge base that are applicable to the input. The system identifies documents that are applicable to the query by identifying comparative features/statements found in the natural language text documents and evaluating those comparative features with the conditions of the input. When the conditions of the comparative features evaluate with the input conditions the document is considered a match. The system processes the documents through a value type filter to understand the mathematical equivalent of the comparative feature and uses this mathematical equivalent in the evaluation of the document and input.

14 Claims, 5 Drawing Sheets

IDENTIFYING MATHEMATICAL OPERATORS IN NATURAL LANGUAGE TEXT FOR KNOWLEDGE-BASED MATCHING

CROSS REFERENCE TO RELATED APPLICATIONS

This application is related to U.S. patent application Ser. No. 14/106,762 entitled "Building features and indexing for knowledge-based matching", filed Dec. 14, 2013 by Navendu Jain, et al., and U.S. patent application Ser. No. 14/106,763 entitled "Query techniques and ranking results for knowledge-based matching" the entire contents of which are hereby incorporated by reference for all they teach and contain.

TECHNICAL FIELD

This description relates generally to generation of an enhanced index for documents or articles contained in a knowledge base, and using that enhanced index for text-based matching

BACKGROUND

Consumers of software applications typically have problems associated with the software come up. These problems range from configuration errors to system crashes. When the consumer encounters these type of problems they usually first try to find a solution to the problem by consulting with a search engine. The search engine aims to find relevant documents from an index that was created by crawling through web documents, discussion boards, email threads, software manuals and other publicly available documents. If the search engine does not provide adequate results the consumer will typically call a customer support service. When dealing with customer issue, a customer support representative or engineer tries to match the reported problem with information contained in a knowledge base database, e.g., by searching the database or using a classification schema. This approach allows the customer support staff to provide the user with the expert written facts and rules to solve the customer's problem.

However, the customer support service using humans is extremely costly for companies to provide. Second, this approach risks significant wait times when a large number of customers call the call center at once or within a short time window. This typically occurs, for example, when a new feature is released or a faulty software patch ends up causing new problems on the customer machine. Third, this approach to troubleshooting is dependent on the expert defined rules in the database that risk incompleteness or become outdated as the software evolves. Finally, this approach only solves the problem that is reported or presented by the customer to the customer support but it does not identify other potentially related problems such as the need to apply a specific security patch.

Search engines such as Google and Bing have been optimized to output highly relevant results for a given query. However, their techniques focus on text-based matching of the query terms or its extensions such as spell correction or changing the order of terms to enable matching of relevant documents. This approach makes it difficult to correctly identify and analyze configuration errors based on the information contained in the articles (e.g., technical solutions) in the knowledge base. This is because these articles are written in natural language text, they are highly domain-specific, and they often use abbreviations and synonyms for technical words and also may describe conditional constraints on the configuration parameters and values in the specific documents that indicate configuration parameter settings where the document is relevant and where it is not relevant. As such the problem or error reported/presented by the consumer may not be easily searchable in the knowledge base articles.

One additional problem that occurs when documents are returned from a knowledge base is that documents are often only applicable to specific versions or specific configurations. As such a document that may appear to be a match will be returned when in fact that document is not applicable to the input query. This can happen when for example a document indicates that it is applicable to version X and newer or version Y and older. These limitations are ignored by the current systems because they search for hits without regard for any comparative information contained in the documents.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a system and method for taking a snapshot or input from a source and identifying appropriate documents in a knowledge base that are applicable to the input. The system identifies documents that are applicable to the query by identifying comparative features/statements found in the natural language text documents and evaluating those comparative features with the conditions of the input. When the conditions of the comparative features evaluate with the input conditions the document is considered a match. If not the document is not considered a match. The system processes the documents through a value type filter to understand the mathematical equivalent of the comparative features and uses this mathematical equivalent in the evaluation of the document and input. Additionally, the system can handle multi-conditional statements where a comparative feature is expressed as needing to meet two or more different comparative features for the same condition.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
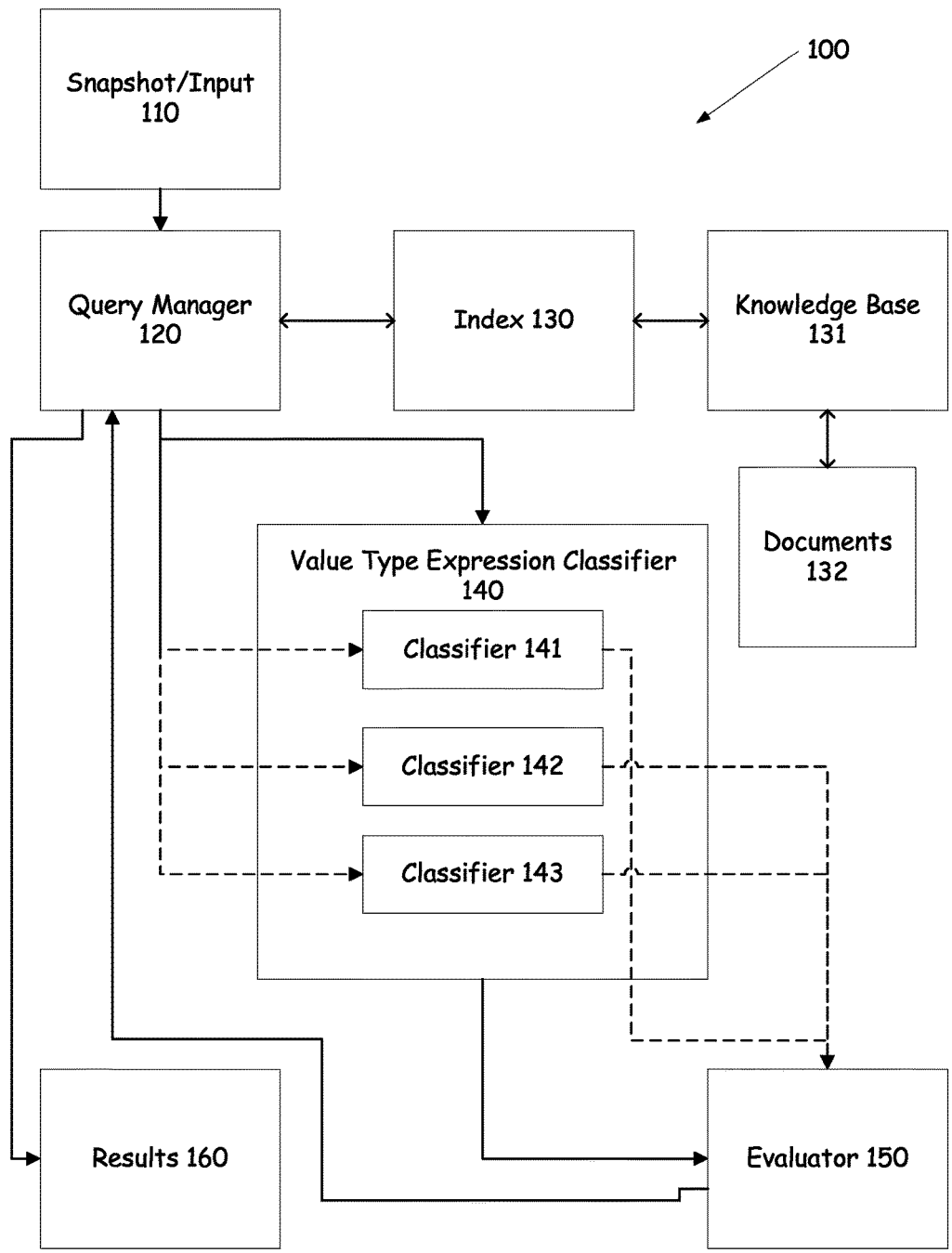
FIG. 1 is a block diagram illustrating components of a system implementing the value type expression classifier and evaluator according to illustrative embodiments.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a block diagram illustrating a system 100 implementing a value type expression evaluator 150 according to illustrative embodiments. System 100 includes a query manager 120, an index 130, a value type expression classifier 140 and an evaluator 150. At a high level, value-type expressions evaluator 150 of system 100 implements three binary classifiers, which will classify a sentence in an article or document into one more classes denoting mathematical comparative operators, including "Less than", "more than", and "equals to" respectively. After the classification detects the value-type expressions in the sentence, the result will be sent to the evaluator 150 to check whether the input property name and value matches those in the value-type expressions in the sentence.

System 100 in one embodiment receives a snapshot 110 of one or more configurations (e.g., software configuration file) of one or more physical machines, virtual machines, applications, etc., that are monitored by a system manager, such as System Center. However, other system monitors may be used to generate the snapshot. In other approaches the snapshot can be any form of input that can be parsed to determine a search query or search terms from the input. Snapshot 110 in one embodiment is a set of configurations for a particular machine. A configuration typically consists of a list of property name and its corresponding value pairs. A snapshot typically has many of the property values consist of a numeric type, such as an integer, a float, version number, etc. For example a numeric value in a configuration may be "number of logical processors=8" where the property name is "number of logical processors" and the value is "8". This snapshot is provided to the query manager 120.

Query manager 120 is a component of the system 100 that is configured to receive the snapshot from the monitored machines or other source and generate a search query or queries from the snapshot. The query manager 120 may generate one or more queries from the configurations that are contained in the snapshot. The query manager 120 preprocesses the snapshot to generate the one or more search queries. For example, the query manager 120 takes the snapshot and tokenizes the input by tagging the value of the numeric type in each of the configurations. The query manager 120 may create individual search queries for each of the configurations. In some embodiments the query manager 120 may create search queries that combine one or more of the configurations together. For example the query manager 120 may generate 3 different search queries for a snapshot that includes the configurations of "number of logical processors=8" and "memory=128". In this example each configuration would be its own search query and the third search query would be the combination of both configurations. In this way the query manager 120 can attempt to find documents that match each of the configurations as well as the combined configuration.

Index 130 is a component of the system 100 that allows the system to find knowledge based documents in a knowledge base 131. These knowledge based documents are in one embodiment a database or other data repository that stores articles or documents related to a specified knowledge base. For example, the knowledge base may contain a plurality of articles related to a specific computer software product, such as SQL Server or Microsoft Word, a computing system in general, or any other topic where knowledge based articles and documents may be produced or consumed, this may further include documents that were created by customer service persons during the reporting or assistance with an incident. In some embodiments knowledge base 131 may hold knowledge based articles for multiple different topics or related to many different products. The documents 132 held in the knowledge base 131 are indexed in index 130 in such a way as to allow the documents to be accessed quickly by a search engine or other query delivery system, such as query manager 120. Documents or articles can also include feeds from social media sites or from online forums. Index 130 provides a mapping for each document in the knowledge base 131 to a list of associated features for the document or when the index 130 is an inverted index 130 from each feature to its associated document or documents.

Value type expression classifier 140 is a component of system 100 that is configured to identify from the index 130 tokens the value type associated with a token. The value type expression classifier in some embodiments is a learning classifier that can improve its knowledge for classification based on experience. Each document in the knowledge base that is indexed has been annotated to provide further hints related to encountered numbers. This typically occurs in articles that discuss certain software versions or specific system set ups. For example an article may state "In SQL, if the number of logical processors is less than or equal to 8, set the InMemory bit to true . . . . " The value type expression classifier 140 access the index 130 stream a token for Numeric or Boolean at the same position in the token stream as the identified value token. Thus, the value type expression classifier 140 detects numerals, true/false and version numbers contained within the document's index 130. Additional values such as Enumerations may also be detected and identified by the value type expression classifier 140. The value type expression classifier 140 then passes the document's index 130 through the classifiers 141, 142 and 143, or in some embodiments the index for a set of matched sentences in the document are passed through the classifiers as opposed to the entire document's index 130.

The value type expression classifier 140 includes three different value type classifiers. These classifiers include the 'less than' classifier 141, the 'larger than' classifier 142 and the 'equals to' classifier 143. While the three classifiers are illustrated additional classifiers may be present in the value type expression classifier 140 to account for other types of expressions that can be expressed. Further, in some embodiments the classifiers are machine learning classifiers. For example, classifiers may be present that can address ideas or concepts like "combined" "missing" "without" etc. Each of the classifiers 141, 142 and 143 performs a specific analysis on the index 130 stream from the document to determine if there are comparative features present in the document. That is, for example, the many various ways of expressing comparisons has been indexed in such a manner that the classifiers 141, 142, and 143 are able to understand the concept for application. For example, the less than classifier 141 understands that the phrases "less than" "fewer than" "no more than" "up to" etc. are all related to the concept of "less than". Similarly, the more than classifier 142 understands phrases that indicate the concept "more than", :"larger than", "bigger than", "after" etc. . . . Likewise the equal to classifier 143 understands phrases and expressions that indicate "equality". The document is passed through each of the classifiers 141, 142 and 143 to determine if the document includes text that matches the phrases associated with each of the classifiers. The document (or the matched sentences in the document) is passed through each of the classifiers. The classifier will only output information to the index 130 if the conditions it is looking for are true. If the document contains a phrase that matches the expected comparison the corresponding classifier will add to the document index 130 the corresponding value type expression. For example, the phrase in a document stating "number of logical processors is less than or equals to 64" will match against two of the classifiers. That is the phrase will match with less than classifier 141 and the equal to classifier 143. This will cause the document to be sent to the evaluator 150 with two conditions as being present but a hit with the query term only requires one of the two conditions to be met. In some embodiments the value type expression classifier 140 returns the results back to the index 130 for storage with the corresponding document for future use.

Once the document has been passed through the value type expression classifier 140 the document with the corresponding value types is passed to the evaluator 150. The evaluator 150 is a component of system 100 that is configured to evaluate the document against the input query that caused the document to be returned as a result. Each document that is received has been indexed to include information related to the value types that can be encountered in the document. The evaluator 150 takes the document and applies the indicated comparison from the value type expression classifier 140. The evaluator 150 determines that for a particular document that the value from the query meets the conditions of the document it outputs a value of true indicating that the document is a hit. If the evaluator 150 determines that the value in the query does not meet the comparison condition from the document the evaluator 150 determines that the document is not a hit. In the case where the document has been annotated by the value type expression classifier 140 as having an 'or' condition such as "less than or equal" the evaluator 150 will evaluate both conditions and if either condition is true will output the document as a hit. The documents that are determined to be a hit are output to the user as results 160. The results 160 can be a listing of documents that matched. Other methods of outputting the documents may be used as well. The indication of the hits are returned to the query manager 120 such that any subsequent processing of the documents can occurs such as ranking the documents or determining access permissions to the documents may be performed prior to outputting the documents for consumption.

Figure 2:
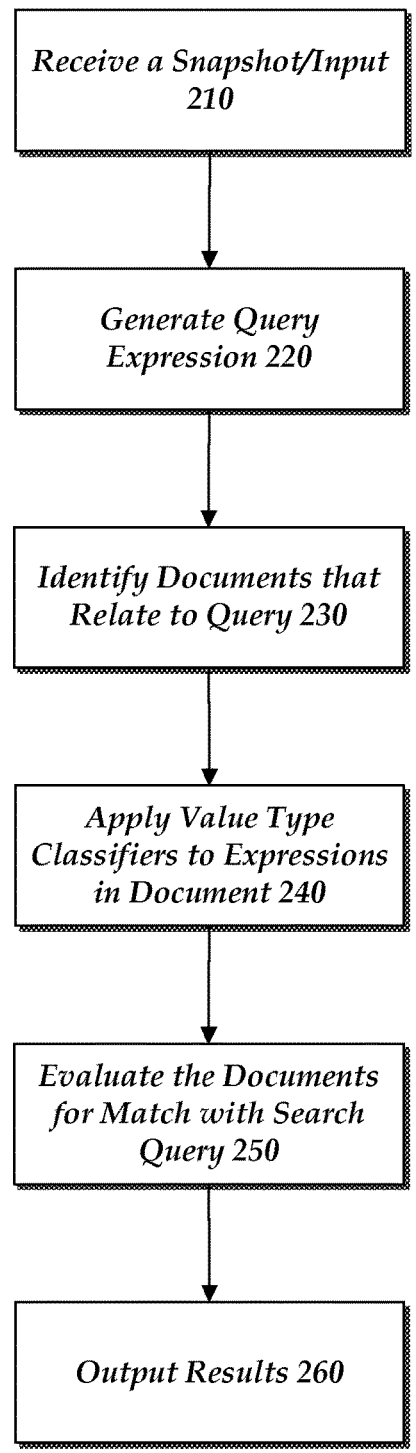
FIG. 2 is a flow diagram illustrating the process for identifying documents that match an input based on an evaluation of comparative features found in a natural language text document according to illustrative embodiments.

FIG. 2 is a flow diagram illustrating a method for identifying documents in a knowledge base that have comparative features in the document that meet a particular query.

The process begins with the receipt of a snapshot. This is illustrated at step 210. The snapshot may be a configuration snapshot of one or more physical machines, virtual machines, applications, etc., being monitored by a monitoring system or may be an input placed by a user who is looking for specific information related to a current need. The snapshot includes at least one property name and value pair.

The snapshot is passed to a query manager 120 which preprocesses the snapshot to convert the information in the snapshot into a query expression. This is illustrated at step 220. The query manager 120 in one embodiment tokenizes the snapshot and tags the value of the numeric type in the snapshot. The query manager 120 may convert a snapshot configuration of "number of logical processors=8" to "number of logical processors=NUMERIC" such that a search of an index 130 will return all documents that have an index 130 discussing the number of logical processors.

Next the knowledge base is searched to identify documents that match the query/queries that were generated by the query manager 120. This is illustrated at step 230. In some instances this step may be performed using meta-data that is present in the index as opposed to accessing the knowledge base directly. Documents in the knowledge base or other document/information repository are identified during the search phase by comparing the index 130 of the document to the terms found in the query. While the search terms may be generic in that they do not include the specific numeric values for this step, the results may be ranked at this time. For example, a query having only one property value pair match may be ranked lower than a result that matches a query having two or more property value pairs.

Once the documents have been identified at step 230 the system then processes each document through the value type expression classifier 140. This is illustrated at step 240. In some embodiments each document is processed through the value type expression classifier 140 as the document is identified. In other embodiments this process is delayed until such time as all or a threshold number of documents has been retrieved. In yet other embodiments the documents in the knowledge base may have been processed through the value type expression classifier 140 prior at the time they were indexed. In this embodiment, step 240 may be skipped all together or re-run to capture new expressions that may have been determined since the document was previously run through this process. In some embodiments the results of step 240 may be stored back in the index 130 for the document to speed future reviews. At this step the document is passed through each of the classifiers that are present in the value type expression classifier 140. Each of the classifiers (such as classifiers 141, 142, 143) applies its own classification rules and analysis to the document. Each of the classifiers determines if the document meets the requirements of the classifier. For example, the less than classifier 141 determines if the document includes a phrase that has been determined to mean "less than". If the classifier 141 determined that the document meets the criteria the document is annotated or additional indexed with the indication of the "less than" and also the numeric value associated with the term is added to the index 130 or annotation. The same process happens for each of the other classifiers that may be present. The output from each classifier is either true or false that the document includes the appropriate meaning.

Once the document(s) have been processed through the value type expression classifier 140 the output is passed to the evaluator 150 for a determination if the document meets the desired search query. This is illustrated at step 250. The evaluator 150 takes the annotated document that has been annotated or indexed with the value type classifiers and determines if document satisfies the query. For example if the query that was derived from the snapshot indicated "number of logical processors=8" the evaluator 150 will determine if any of the documents satisfy this constraint. With the use of the value type classifiers, the evaluator 150 will apply the comparative features of the document to the value in the query. Thus, documents that were determined to have the value type "more than" and the numeric value of "64" with respect to "number of logical processors" would fail the evaluation and not be considered a hit. Whereas a document that was determined to have a value type "less than" and the numeric value of "64" with respect to "number of logical processors" would pass the evaluation and be considered a hit. Likewise, a document that was determined to have a value type "equal to" and the numeric value of "8" with respect to "number of logical processors would pass the evaluation while all other documents would fail the evaluation.

Following the evaluator 150 evaluating the returned documents according to the comparative values of the document, the results are output. This is illustrated at step 260. The results may be presented to a user in any format that is useful to the user. This may include a list of results or simply the matching documents. The results presented may be ordered in terms of relevance to the desired query. This ordering may be based on the relative closeness to the original query or based on the number of query terms in the query that were matched.

Figure 3:
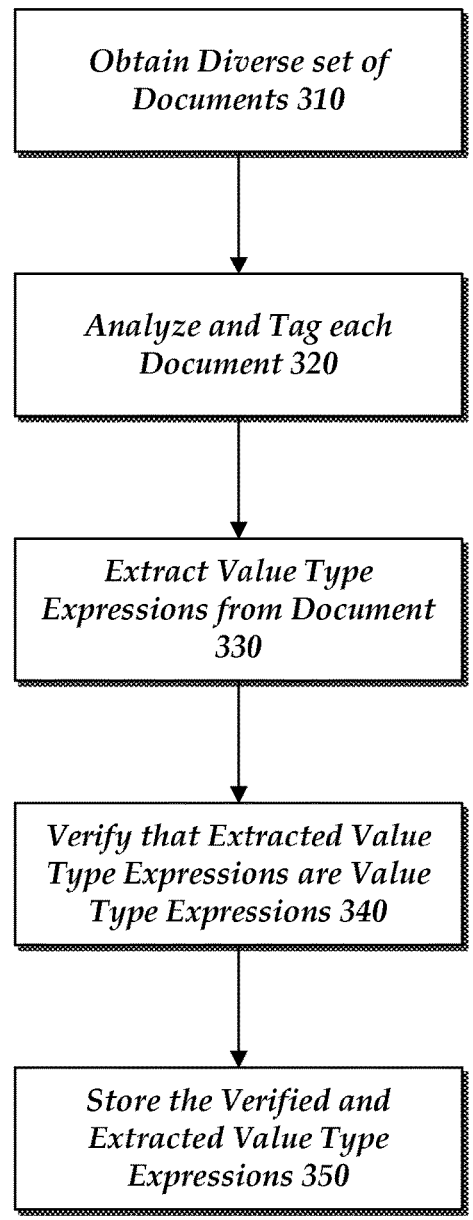
FIG. 3 is a flow diagram illustrating a process for identifying comparative features in a natural language text document according to illustrative embodiments.

FIG. 3 is a flow diagram illustrating a method for training or otherwise conditioning the value type expression classifier 140 to understand and process the various means of expressing comparative features found in natural language text documents. This process can also be repeated or used when the system encounters new expression of a comparative feature. The classifiers discussed herein are learning based classifiers that learn based on either machine learning approaches, direct input or both.

The process begins by obtaining a diverse set of documents that are written in natural language free-form text. This is illustrated at step 310. The diverse set of documents can be from a knowledge base such as knowledge base 131 or from another source. The diverse set of documents should provide a number of different examples of each of the types of comparative expressions that are being used as classifiers in the value type expression classifier 140. For example, the set of documents should have a number of different expressions that mean "less than" if a less than classifier is used, a number of different expressions that mean "more than" if a more than classifier is used and so forth. The set of documents can be divided in some embodiments such that only a portion of the documents are used for the learning stage and a portion of the documents are used to verify, test or tune the classifiers.

Once the set of documents has been obtained each of the documents is analyzed and tagged. This is illustrated at step 320. At this step the each of the documents is parsed and each character word and number found in the document is tagged with a label indicating the particular word's part of speech. Any process that can identify part of speech may be used at this step to identify the parts of speech in the document. An example of the various tags that can be added to a document is illustrated below with respect to table 1.

TABLE 1

| | |
|---|---|
| # | Pound sign |
| $ | Dollar sign |
| " | Close double quote |
| " | Open double quote |
| ' | Close single quote |
| ' | Open single quote |
| , | Comma |
| . | Final punctuation |
| : | Colon, semi colon |
| LRB | Left bracket |
| RRB | Right bracket |
| CC | Coordinating conjunction |
| CD | Cardinal number |
| DT | Determiner |
| EX | Existential there |
| FW | Foreign word |
| IN | Preposition |
| JJ | Adjective |
| JJR | Comparative adjective |
| JJS | Superlative adjective |
| LS | List Item Marker |
| MD | Modal |
| NN | Singular noun |
| NNS | Plural noun |
| NNP | Proper singular noun |
| NNPS | Proper plural noun |
| PDT | Predeterminer |
| POS | Possessive ending |
| PRP | Personal pronoun |
| PP$ | Possessive pronoun |
| RB | Adverb |
| RBR | Comparative adverb |
| RBS | Superlative Adverb |
| RP | Particle |
| SYM | Symbol |
| TO | To |
| UH | Interjection |
| VB | Verb, base form |
| VBD | Verb, past tense |
| VBG | Verb, gerund/present participle |
| VBN | Verb, past participle |
| VBP | Verb, non 3rd ps. sing. present |
| VBZ | Verb, 3rd ps. sing. present |
| WDT | Wh determiner |
| WP | Wh pronoun |

TABLE 1-continued

| | |
|---|---|
| WP$ | Possessive wh pronoun |
| WRB | Wh adverb |

The particular designations of each part of speech should be in a format that is understandable by the various classifiers employed by the value type expression classifier 140.

After tagging the set of documents at step 320, the next step in the process is to extract the value type expressions from the tagged documents. This is illustrated at step 330. At this step the value type expressions are identified and separated from the rest of the words found in the documents. In one example the value type expressions are categorized into three types, 1) less than, 2) more than, 3) equals to. Again depending on the type and number of classifiers present other categories may be used. Next regular expressions are used to define the most frequently used expressions for each of the categories.

An example of the regular expressions used to extract "less than", "more than", and "equals to" are illustrated in table 2, table 3, and table 4 below. In this example the system uses loose regular expressions to get as many potential value type expressions as possible. The expressions that are used for this stage may have been predefined prior to the application of the tagging. For example the following phrases may have been identified as being relevant to each of the classifiers.

<less> is defined as less|lower|smaller|fewer|earlier and etc.

<more> is defined as more|greater|larger|longer|newer|later|higher|newer and etc.

<equal> is defined as equal|set|is| are and etc.

<negation> is defined as not|no and etc.

<max> is defined as max|Max|maximum|Maximum|at most|up tp|limit|upper bound and etc.

<min> is defined as min|Min|minimum|Minimum|at least|lower bound and etc.

Each of these terms may later be added based upon the analysis found during the use of the system or this training stage.

TABLE 2

(Less Than) - Variable < Number

| Regular Expression | Note |
|---|---|
| /NN.{1,50}(<less>).{1,50}/CD | [Var] < [Num] |
| /NN.{1,50}(<negation>)/RB.{1,50}(<more>)/JJR.{1,50}/CD | [Var] not > [Num] |
| (<less>).{1,50}/CD.{1,50}/NN | less than [Var] [Num] |
| /NN.{1,50}/CD.{1,50}(<less>)/JJR | [Var] [Num] or/and less |
| /CD (?!or.{1,50}/JJR).{1,50}.(<more>)/JJR (?!(information\|Information\|practice\|Practice)).{1,50}NN | [Num] > [Var] |
| /CD (?!or.{1,50}/JJR).{1,50}.(<negation>)/RB.{1,50}(<less>)/JJR.{1,50}NN | [Num] not < [Var] |
| /NN.{1,50}(<max>).{0,10}/(NNP\|NN\|VB.\|).{1,50}/CD | [Var] max [Num] |
| [A-Za-z].{1,10}(<max>).{0,50}/NN.{1,50}/CD | max [Var] [Num] |

TABLE 3

(More Than) - Variable > Number

| Regular Expression | Note |
|---|---|
| /NN.{1,50}(<more>)/JJR.{1,50}/CD | [Var] > [Num] |
| /NN.{1,50}(<negation>)/RB.{1,50}(<less>)/JJR.{1,50}/CD | [Var] not < [Num] |

TABLE 3-continued (More Than) - Variable > Number

| Regular Expression | Note |
| --- | --- |
| (<more>).{1,50}/CD.{1,50}/NN | more than [Var] [Num] |
| /NN.{1,50}/CD.{1,50}(<more>)/JJR | [Var] [Num] or/and more |
| /CD (?!or.{1,50}/JJR).{1,50}.(<less>)/JJR.{1,50}NN /CD | [Num] <[Var] [Num] not > [Var] |
| (?!or.{1,50}/JJR).{1,50}.(<negation>)/RB.{1,50}(<more>)/JJR.{1,50}NN | |
| /NN.{1,50}(<min>).{0,10}/(NNP\|NN\|VB.\|).{1,50}/CD | [Var] min [Num] |
| [A-Za-z].{1,10}(<min>).{0,50}/NN.{1,50}/CD | min [Var] [Num] |

TABLE 4

(Equal To) - Variable = Number

| Regular Expression | Note |
| --- | --- |
| /NN.{1,50}(equal\|set).{1,50}/CD | [Var] = [Num] |
| /CD.{1,50}(equal\|set).{1,50}/NN | [Num] = [Var] |
| /NN.{1,50}(<max>).{0,10}/(NNP\|NN\|VB.\|).{1,50}/CD | [Var] max [Num] |
| [A-Za-z].{1,10}(<max>).{0,50}/NN.{1,50}/CD | max [Var] [Num] |
| /NN.{1,50}(<min>).{0,10}/(NNP\|NN\|VB.\|).{1,50}/CD | [Var] min [Num] |
| [A-Za-z].{1,10}(<min>).{0,50}/NN.{1,50}/CD | min [Var] [Num] |

Through this tagging process, for the example of three classifiers, there are three key factors that can determine whether a sentence is expressing a relationship of "less than", "more than", or "equals to". These features include the appearance of some key words. For example, a comparative adjective and verb, such as more, larger, bigger, less, fewer, earlier, and etc. . . . ; a superlative adjective and verb, such as most, least, up to, limit, upper boundary, lower boundary, ad etc.; verbs that means equals to, such as equals, set to, and etc.; numbers, such as integer, float, version, and Boolean; and negation, such as not and no. Further, the order and distance between these key words is important to the determination if the comparison word actually applies to the associated number value.

Additionally, the appearance of some special words, such as "than" after comparative adjective, "to" after equal, the "or/and" appears between the number and comparative adjective. The appearance of these words and structure indicate that it's very likely that the sentence contains a value type expressions To determine if the words are close enough between each other the system applies a distance function. The distance function defines the number of words or characters that can appear between the comparative word and the value that is associated with the comparative word. Equation 1 illustrates and exemplary distance function that may be employed by the system.

$$Dist(A, B) = \begin{cases} B's \text{ position} - A's \text{ position}, & \text{if } A \text{ and } B \text{ exist in the sentence} \\ MaxDist, & \text{if } A \text{ or } B \text{ doesn't exist in the sentence} \\ & \text{or } B's \text{ position} - A's \text{ position} > MaxDist \\ -MaxDist, & \text{if } B's \text{ position} - A's \text{ position} < -MaxDist \end{cases}$$

Equation 1
where A and B are two words in a sentence, and MaxDistance is set to 20. However, in other embodiments the MaxDistance may be set to any other number that is determined to be effective.

Table 5 below illustrates some example features that can be derived from the analysis of the set of documents through the part of speech analysis. The use of the number "1" and "2" after a particular part of speech is provided as a means to add the meaning to the part of speech tagged word as used by the classifiers. Each of these parts of speech may be identified through the use of a list of words that has been determined previously to have that comparative meaning.

TABLE 5

| Feature Name | Description | Feature Type |
| --- | --- | --- |
| JJR1 | the appearance of comparative adjective or verb means "more than". 1 if exists, 0 if not | Float |
| JJR2 | the appearance of comparative adjective or verb means "less than". 1 if exists, 0 if not | Float |
| JJS1 | the superlative adjective or verb means "more than". 1 if exists, 0 if not. | Float |
| JJS2 | the superlative adjective or verb means "less than" exists. 1 if exists, 0 if not. | Float |
| Equal | the appearance of words that means "equal" 1 if exists, 0 if not. | Float |
| CD | the appearance of value type, such as integer, float, version, boolean, and etc. 1 if exists, 0 if not. | Float |
| Unit | unit of all kinds, such as bit, byte, second, hour, day, and etc. This is a text feature, each unique value will be a new feature. | Text |
| Neg | the appearance of negation. 1 if exists, 0 if not. | Float |
| Dist(Neg, JJR1) | the distance between Neg and JJR1 | Float |
| Dist(Neg, JJR2) | the distance between Neg and JJR2 | Float |
| Dist(Neg, JJS1) | the distance between Neg and JJS1 | Float |
| Dist(Neg, JJS2) | the distance between Neg and JJS2 | Float |
| Dist(Neg, Equal) | the distance between Neg and Equal | Float |
| Dist(Ne, JJR1) | the distance between NE and JJR1 | Float |

TABLE 5-continued

| Feature Name | Description | Feature Type |
| --- | --- | --- |
| Dist(Ne, JJR2) | the distance between NE and JJR2 | Float |
| Dist(Ne, JJS1) | the distance between NE and JJS1 | Float |
| Dist(Ne, JJS2) | the distance between NE and JJS2 | Float |
| Dist(Ne, Equal) | the distance between NE and Equal | Float |
| Dist(JJR1, Cd) | the distance between JJR1 and CD | Float |
| Dist(JJR2, Cd) | the distance between JJR2 and CD | Float |
| Dist(JJS1, Cd) | the distance between JJS1 and CD | Float |
| Dist(JJS2, Cd) | the distance between JJS2 and CD | Float |
| Dist(Equal, Cd) | the distance between Equal and CD | Float |
| Dist(Ne, Cd) | the distance between NE and CD | Float |
| Text | text extracted from the documents | Text |

After the tagging process of step 330 the results are checked to verify that results match the indicated comparative feature. This is illustrated at step 340. At this step a manual process is implemented to evaluate each extracted sentence. This process reviews the returned results according to part of speech identification and the human analysis of the returned results. This analysis determines if the system made the correct choice with regards to the comparative feature of the sentence in the document. The process simply confirms or corrects the determination. The expressions that are looked at or examined are tagged with a "0" or a "1". Where "0" indicates that the hit was incorrect and "1" indicates that the hit was correct. To simplify the process and avoid overload only those sentences that were identified by the tagging system as containing a comparative feature are returned. In some embodiments the confirmation process is done automatically using a second system that uses machine learning to understand the context of the sentence. Further in additional embodiments, the subject of the sentence may be identified such that the context in which the comparative feature is being used is better understood to the system.

The verified and extracted value type expressions are then stored or otherwise retained for use by the classifiers. This is illustrated at step 350. These expressions may be added to the definitions used by the classifiers to understand the particular value type expression. These expressions may be updated over time by having an administrator or other person review the value type expressions associated with a classifier or maybe achieved by re-running the process. The learning based classifiers discussed herein may be optimized to employ multi-class classification for identifying a pattern in multiple classifications at once or for recognizing multiple patterns at the same time.

Returning back to FIG. 1 in an alternative embodiment the evaluator 150 may be configured to evaluate a document for a multi-conditional statement. In this embodiment the evaluator 150 is referred to as a multi-conditional value type (MCVT) evaluator. The MCVT evaluator is configured to perform a two-fold operation: (1) match property name/value pairs found in configuration snapshots (files that describe machine/software configuration) against logical expressions described using natural language free-form text in knowledge base articles and (2) evaluate the logical condition for the property value described in the configuration snapshot. The natural language text (aka free-form text) processed by the MCVT evaluator is usually more complex than what a primitive value-type classifier can handle. One example of a non-trivial logical expression being described in natural text is the following: "This software requires an ATI adapter driver version later than 4.03 and earlier than 5.24". This sentence implicitly contains the constraint: Version $\in [4.03, 5.24]$ indicated through two comparative clauses "later than" and "earlier than" and two version values "4.03" and "5.24". This is beyond the scope of an evaluator that expects the underlying text to have a single comparative clause and value. An even more complex example is the following: "the value should be less than 5 (except for 0)", where the constraint is the combination of a comparative and a negation clause. This approach is difficult to apply conventional machine learning to cases like this since there as current approaches do not provide a straight-forward way to build an accurate and reliable data model for these complex cases. The MCVT evaluator in some embodiments may support the identification and evaluation of two or more mathematical operator conditions in natural language free-form text.

To handle complex value-type expressions, the MCVT evaluator applies a rule-based approach that uses patterns (referred to as regular expressions above) to match logical expressions described in natural language free-form text. For example, in order to express the meaning of "A is more than B" one could say in one of the following ways: "A is more than B", "A is no less than B", "A is at least as high as B", or "The minimum value of A is B". Other ways of expressing this may also be used. These examples suggest that sentences containing the patterns "<NE><JJR> than <CD>","<NE> no<JJR> than <CD>, and "<NE> at least as <JJR> as <CD>", should be considered as possibly containing a multi-conditional statement. Where "<NE>", "<JJR>", "<CD>" are part-of-speech (POS) tagging notations referring to named entity, comparative adjective and cardinal numbers, respectively. Further a minimum/maximum distance should also be considered between these parts of speech.

Figure 4:
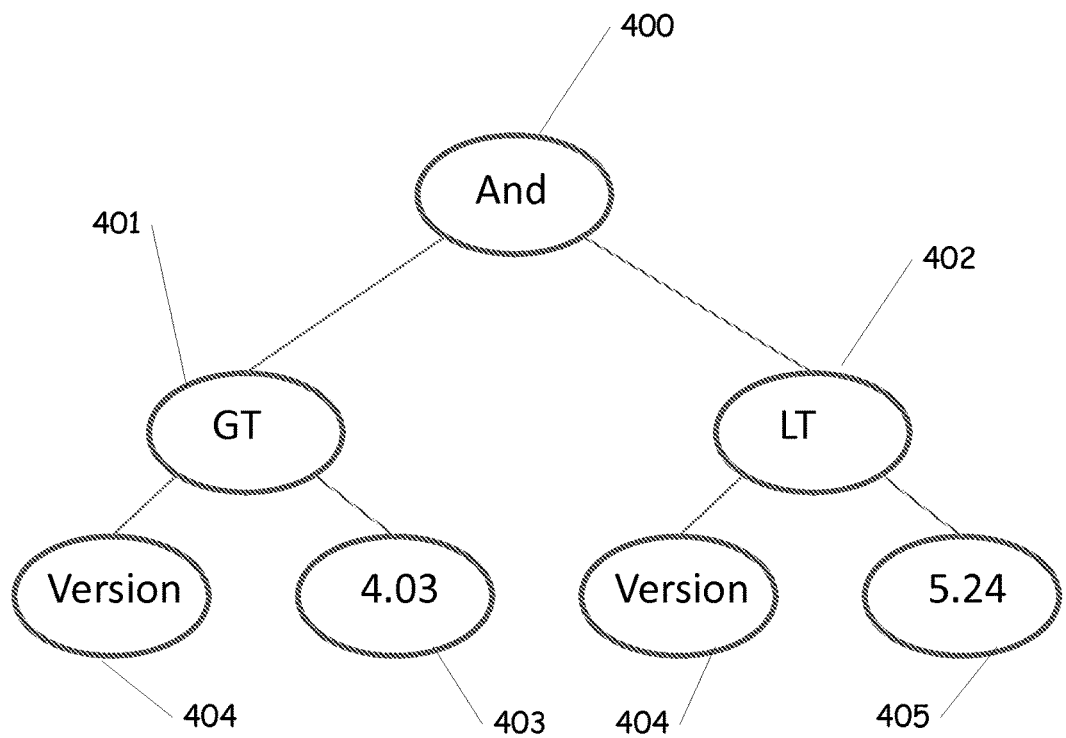
FIG. 4 is an illustration of an expression tree that may be used by the multi-conditional value type evaluator according to one illustrative embodiment.

The following are various examples that express multi-conditional constraints in natural language. "A is more than B but less than C", and "A is more than one of the values B, or C, or D". An example of the multi-conditional constraints is illustrated in FIG. 4 as an expression tree. The expression tree illustrated in FIG. 4 is representative of a conditional statement in natural language text of "This software requires an ATI adapter driver version later than 4.03 and earlier than 5.24". This expression is determined by the MCVT to correspond to the mathematical logical expressions of "more than" and "less than" with the logical statement requiring both conditions to be true. Element 400 represents the concept that both conditions must be true. Elements 401 and 402 represent the logical concept of "more than" and "less than" respectively. Element 404 represents the concept that the word "version" should be associated with the numbers represented by elements 403 and 405 respectively. This expression tree is provided to illustrate the concept.

In order to extract the values from a multi-condition constraint, the indexing process that is used to index the document is modified to add additional enumerations that identify certain patterns in the natural language text.

In one embodiment the MCVT evaluator is configured to recognize four high level patterns. However over time additional patterns may be added to the MCVT evaluator as different ways of expressing the multi conditional statements are learned. The four patterns that are used by the MCVT are discussed below.

Pattern 1—Cases that contain multiple comparative clauses (e.g. A is larger than X and smaller than Y)

Pattern 1 can be broken down into three sub-cases:

Pattern 1a—" . . . than . . . but| and|or . . . than . . . "

Pattern 1a describes cases where there are two comparative clauses joined by a conjunction. Two examples of pattern 1a are: "client us version driver later than 4.03/version and earlier than 5.24/version ATI adapt driver" and "alert user data value less than 0/numeric or greater than 100/numeric or not number and clear"

In the first example, there are two comparative clauses "later than . . . " and "earlier than . . . "; the two value strings are versions tagged as "4.03/version" and "5.24/version"; the conjunction is "and". The second example is similar to the first one except that the value types are numeric tagged as "0/numeric" and "100/numeric" and the conjunction is "or".

Considering the first example, the regular expression extracts the comparative adjectives "later" and "earlier", the version values "4.03" and "5.24", and the conjunction word "and". Mathematically this sentence is equivalent to saying "x>4.03 && x<5.24", where "x" is the subject value. This means that if the property value is "4.2", then the expression evaluates to "true" since "4.2> 4.03" and "4.2<5.24". On the other hand, if the property value is "3.0" then the expression evaluates to "false", since "3.0<4.03" which doesn't satisfy the first constraint.

Pattern 1b—" . . . other than . . . or . . . "

The pattern states a list of values from which the subject should have a different value. We use the following regular expression to extract the list of values following the comparative clause "other than" or "different than" Two examples for pattern 1b are: "with status codes different than 0x80070002/numeric or 0x80070020/numeric" and "Directory Server with a version number different than 5.1/version or 5.2/version".

In the first example, the comparative clause matched by the regular expression is "different than"; the list of values is "0x80070002", and "0x80070020". The sentence is equivalent to the mathematical expression "x !=0x80070002 && x !=0x80070020". The second example is similar to the first one except that the value type is numeric.

Pattern 1c—" . . . than . . . or . . . "

The pattern states that the value of the subject should be greater/smaller than a list of values. Two examples for pattern 1c are: "that have a path set that is longer than approximately 240/numeric or 250/numeric characters" and "if you have a version of Excel later than 5.0/version or 95/version on your computer". In the first example, the regular expression will extract the comparative adjective "longer", and the list of values "240" and "250". Mathematically the sentence is equivalent to "x !=240 && x !=250". The second example is similar to the first one except that the values are versions instead of numeric values.

Pattern 2—" . . . between . . . and . . . "

The pattern states that the subject value should be between a range (value1, value2) or (value2, value1). The two values are extracted by the matching group "value1" and "value2", and the value type tags are extracted by "valuetype1" and "valuetype2". Two examples pattern 2 are: "change the following registry value to a value between 0/numeric and 12/numeric" and "cast datagram destination address between 224.0.0.0/version and 224.0.0.255/version inclusive regardless". In the first example, the regular expression will extract two values "0" and "12". The sentence is mathematically equivalent to "x>=0 && x<=12". The second example is similar to the first one except the values are versions instead of numeric values.

Pattern 3—" . . . equal . . . than . . . " or " . . . than . . . equal . . . "

The pattern states that the subject value should be >= or <=a certain value. The comparative adjectives are extracted by the matching group "comparative1" or "comparative2"; the values are extracted by "value1" or "value2"; the value type tags are extracted by "valuetype1" or "valuetype2". Two examples for pattern 3 are: "the webclnt.dll version is greater than or equal to 6.0.6000.20729/version" and "the file size is equal to or greater than 20/numeric megabytes (MB)". In the first example, the regular expression will extract the comparative adjective "greater" and the version value "6.0.6000.20729". The sentence is equivalent to "x>6.0.6000.20729||x==6.0.6000.20729". The second example is similar to the first one except that the values are numeric values.

Pattern 4—Cases that contain multiple value types but not any explicit comparative clauses Pattern 4 can be broken down into 5 sub-cases.

Pattern 4a—"value . . . or greater|smaller"

The pattern states that the subject value should be >= or <=a certain value. The comparative clause is extracted by named group "comparative". Two examples for pattern 4a are: "any character whose ASCII value is 128/numeric or greater" and "Replication Events" has been set to a value of 1/numeric or higher". In the first example, the regular expression extracts the numeric value "128"; the comparative clause after the value is "or greater". This comparative clause can be matched by the "more than" regular expression, hence the sentence is equivalent to saying "x>=128". The second example is similar to the first example except that the comparative "or higher" is a different way to express "more than".

Pattern 4b—"greater|smaller value . . . or . . . "

The pattern states that the subject value should be >= or <=a certain value. The comparative clause is extracted by the matched group "comparative". Two examples for pattern 4b are: "Set the OLE/DDE Timeout option to a higher value, or set it to zero (0/numeric) to never time out" and "set either to a large enough positive value or to zero (0/numeric)". In the first example, the regular expression extracts the comparative clause "higher" and the value "0". Since the comparative clause "higher" matches the "more than" regular expression, the sentence is equivalent to saying "x>=0". The second example is similar to the first one except that "positive" is a different way to express "more than".

Pattern 4c—" . . . min . . . max . . . "

The pattern states a range of the subject value by designating a minimum and a maximum value. The matched groups "value1" and "value2" extract the upper and lower bounds of the values; "valuetype1" and "valuetype2" extract the value type tags. Two examples for pattern 4b are "Reg_Dword Data Value is in seconds. Min Value: 0/numeric Max Value: 600/numeric in decimal" and "REG_DWORD Data: number of objects to cache Min: 0x0/numeric Max: 0x80/numeric Default: 0x0/numeric". In the first example, the minimum and maximum values extracted are "0" and "600". The sentence is mathematically equivalent to "x>=0 && x<=600". The second example is the same as the first one.

Pattern 4d—" . . . max . . . min . . . "

The pattern states a range of the subject value by designating a minimum and a maximum value. Pattern 4d is symmetric to pattern 4c except that the order of lower and upper bounds is reversed. An example for pattern 4d is "Log Severity (REG_DWORD): maximum 5/numeric, minimum 0/numeric, 4 default". In this example the maximum and minimum values extracted are "5" and "0". The sentence is the mathematical equivalent to "x>=0 &&x<=5.

Pattern 4e—" . . . value . . . or . . . "

The pattern states that the subject value is equal to one of a list of values. Two examples for pattern 4d are "when you set the value to 1/numeric, 2/numeric, or 3/numeric, and the condition is met" and "Default decimal data value: 1000/numeric or 45000/numeric". In the first example, the regular expression extracts the values "1", "2", "3". The sentence is mathematically equivalent to "x==1 x==2∥x==3". The second example is similar which is equivalent to "x==1000∥x==45000".

Each expression that is analyzed by the MCVT evaluator is in one embodiment processed through and expression tree such that the conditions can be evaluated programmatically. In context free grammar the expression tree can be described as:

Root: ExpressionNode

ExpressionNode: Operand|ExpressionAttribute|ExpressionNodeOperator(OperatorType, ExpressNode, ExpressNode)

ExpressionAttribute: Named Entity

Operand: Value|true|false

OperatorType: EQ|NE|GT|GE|LT|LE|AND|OR|NOT

Every valid expression tree starts with a root node which is an instance of an expression node. An expression node can be an operand or the combination of another expression node. Table 6 below expresses how the elements of the patterns discussed above map to the expression tree elements.

TABLE 6

Mapping of multi-condition pattern elements to expression tree elements.

| Pattern element | Expression tree element |
| --- | --- |
| more than | OperatorType.GT |
| less than | OperatorType.LT |
| equal | OperatorType.EQ |
| different than | OperatorType.NE |
| other than | OperatorType.NE |
| but | OperatorType.AND |
| and | OperatorType.AND |
| or | OperatorType.OR |
| except | OperatorType.NOT |
| minimum | OperatorType.GE |
| maximum | OperatorType.LE |
| value | Value |

The following are examples of how an expression tree may be constructed using the above mentioned patterns. The sentence "client us version driver later than 4.03/version and earlier than 5.24/version ATI adapt driver" in the example of pattern 1a contains two comparative clauses "later than" and "earlier than". The first comparative clause expresses the meaning of "more than" while the second comparative clause expresses the meaning of "less than". The two comparative clauses are joined by a conjunction "and". In programming paradigm the logical expression tree is constructed as

```
ExpressionNode root =
    new ExpressionOperator(OperatorType.AND,
        new ExpressionNode(OperatorType.GT,
    ExpressionNode.Attribute("Version"),
    Expression Node.Operand("4.03")),
        new ExpressionNode(OperatorType.LT,
    ExpressionNode.Attribute("Version"),
    ExpressionNode.Operand("5.24")));
```

For a given property value "3.0", the result of the expression tree can be evaluated as:
 var version=new Version("3.0");
 var result=root.Evaluate(version);
As seen from the example, the result of the expression tree as passed through the MCVT evaluator for the value of "3.0" should be false since 3.0<4.03, which violates the first condition. It should be noted that by using the fundamental elements of the patterns and expression trees discussed above, the MCVT evaluator can in other embodiments be extended to process more complex cases, for example sentences that contain more than 2 comparative clauses separated by conjunctions as well as different value types. In this embodiment the MCVT uses the pattern-express tree element map in table 5 to construct programming elements for evaluation of all of the logical expressions that are in the document.

In operation according to one example using the MCVT evaluator the query manager inputs the segment of text that matches the given snapshot property name to the multi-condition value type evaluator. The MCVT uses regular expressions to match and extract the comparative clauses, values and conjunctions from the free-text. The multi-condition value type evaluator tries to find the pattern that matches the given text. If it successfully finds a pattern that matches the text, it uses the "valuetype" match group to extract the value type in the text, and uses the value match group to extract value strings from the text. Based on the value type the evaluator converts the value strings to instances of the value objects in the code. If the pattern contains a comparative clause match group, the evaluator also extracts the comparative clause and uses the regular expression to determine whether the sentence express a relationship of "more than" or "less than" (see pattern 4b). At this point, the evaluator is able to form a logical expression tree which can be used to evaluate the property value. If the property value satisfies the condition of the logical expression, the expression tree outputs "true", otherwise, it outputs "false". If having tried all the patterns the evaluator still cannot find a pattern to match the given text, the evaluator reports failure to the query manager, which then sends the text to the value type classifier for further processing.

The system disclosed herein may in some embodiments be optimized to apply the MCVT evaluator and value-type classifier in a different order for the evaluation efficiency based on a pre-processed pattern defined in the index or an initial classification. Further these multiple MCVT patterns may be evaluated in an optimized sequence for fast determination based on the pre-processed pattern defined in index or initial classification. Furthermore, while the above description has been based on English language text-documents, the processes and system described herein may be used on any natural language text or text in general for the matching process. English is provided merely as an example.

Figure 5:
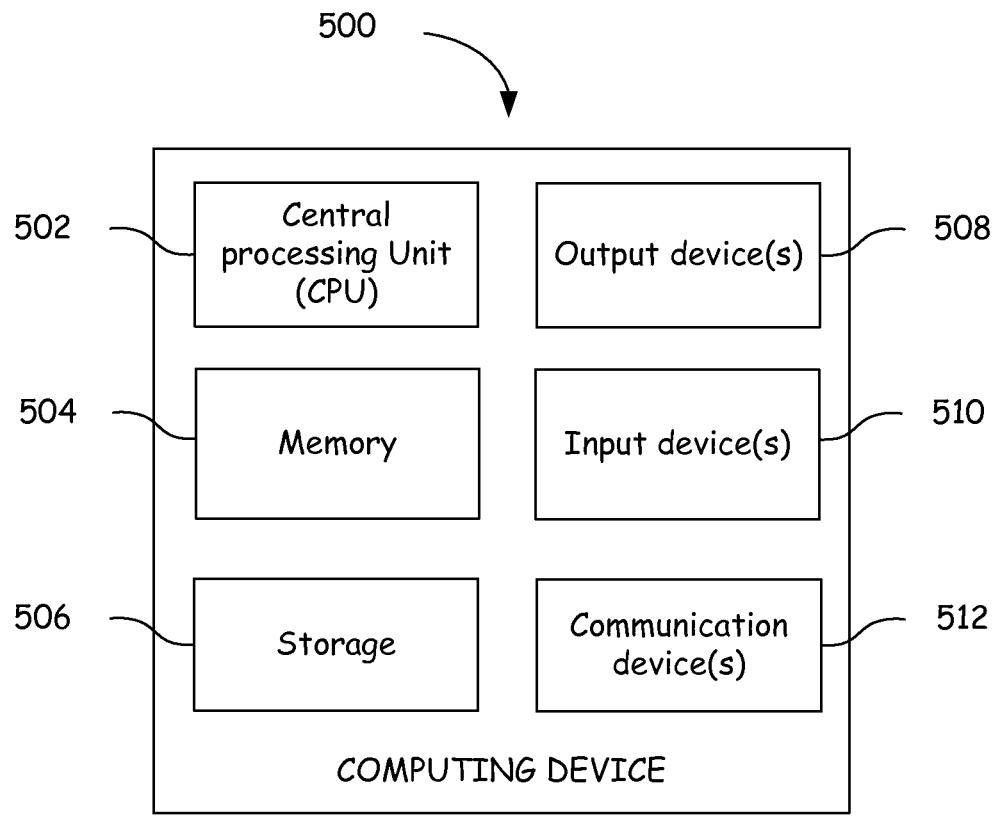
FIG. 5 is a block diagram illustrating a computing device which can implement the enhanced indexing system according to one embodiment.

FIG. 5 illustrates a component diagram of a computing device according to one embodiment. The computing device 500 can be utilized to implement one or more computing devices, computer processes, or software modules described herein. In one example, the computing device 500 can be utilized to process calculations, execute instructions, receive and transmit digital signals. In another example, the computing device 500 can be utilized to process calculations, execute instructions, receive and transmit digital signals, receive and transmit search queries, and hypertext, compile computer code, as required by the system of the present embodiments. Further, computing device 500 can be a distributed computing device where components of computing device 500 are located on different computing devices that are connected to each other through network or other forms of connections. Additionally, computing device 500 can be a cloud based computing device.

The computing device 500 can be any general or special purpose computer now known or to become known capable of performing the steps and/or performing the functions described herein, either in software, hardware, firmware, or a combination thereof.

In its most basic configuration, computing device 500 typically includes at least one central processing unit (CPU) or processor 502 and memory 504. Depending on the exact configuration and type of computing device, memory 504 may be volatile (such as RAM), non-volatile (such as ROM, flash memory, etc.) or some combination of the two. Additionally, computing device 500 may also have additional features/functionality. For example, computing device 500 may include multiple CPU's. The described methods may be executed in any manner by any processing unit in computing device 500. For example, the described process may be executed by both multiple CPU's in parallel.

Computing device 500 may also include additional storage (removable and/or non-removable) including, but not limited to, magnetic or optical disks or tape. Such additional storage is illustrated in FIG. 5 by storage 506. Computer storage media includes volatile and nonvolatile, removable and non-removable media implemented in any method or technology for storage of information such as computer readable instructions, data structures, program modules or other data. Memory 504 and storage 506 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 500. Any such computer storage media may be part of computing device 500.

Computing device 500 may also contain communications device(s) 512 that allow the device to communicate with other devices. Communications device(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 500 may also have input device(s) 510 such as keyboard, mouse, pen, voice input device, touch input device, etc. Output device(s) 508 such as a display, speakers, printer, etc. may also be included. All these devices are well known in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A system for identifying results based on a comparative feature from a knowledge base comprising:
   a query manager configured to take an input having one or more characters and process the input into at least one query expression, wherein the input is a configuration snapshot of at least one monitored computer system, the snapshot comprising at least one property-value pair;
   a search component configured to identify at least one document in the knowledge base matching the at least one query expression, wherein the at least one query expression is a modified version of the at least one property-value pair and wherein a numeric value is removed from the input and replaced with an indication of the numeric value;
   a value type expression classifier component configured to process the at least one document to determine at least one comparative feature in the at least one document; and
   an evaluator configured to evaluate the at least one comparative feature of the at least one document against at least the input to determine if the at least one comparative feature satisfies the at least a portion of the input and to output the document as a result when the comparative feature satisfies the at least a portion of the input.

2. The system of claim 1 wherein the evaluator is further configured to evaluate the at least one comparative feature against the property value pair of the input.

3. The system of claim 1 wherein the configuration snapshot comprises a plurality of property value pairs.

4. The system of claim 1 wherein the value type classifier further comprises a plurality of value type classifiers, each of the value type classifiers configured to analyze the document for a specific value type or a specific comparative feature or a specific mathematical operator.

5. The system of claim 1 wherein the value type expression classifier is further configured to store a determined value type with an index associated with the at least one document.

6. The system of claim 1 wherein the at least one comparative feature is a mathematical expression expressed in natural language text.

7. The system of claim 1 wherein the at least one comparative feature is a multi-conditional comparative feature.

8. The system of claim 7 wherein the multi-conditional comparative feature is a range expressed in natural language text.

9. A computer implemented method for identifying documents having at least one comparative feature expressed in natural language text, the method comprising:
- converting an input having one or more characters into a query expression, wherein the input is a configuration snapshot of at least one monitored computer system, the snapshot comprising at least one property-value pair;
- identifying at least one document in a knowledge base matching the query expression, wherein the query expression is a modified version of the at least one property-value pair and wherein a numeric value is removed from the input and replaced with an indication of the numeric value;
- identifying at least one comparative feature in the at least one document;
- determining if the at least one document is relevant to the input by evaluating the at least one comparative feature against the input to determine if the input meets the comparative feature; and
- outputting the document as a result when the evaluation indicates that the comparative feature is met; wherein the preceding steps are executed by at least one processor.

10. The method of claim 9 wherein identifying the at least one comparative feature identifies a plurality of comparative features in the document.

11. The method of claim 9 wherein identifying the at least one comparative feature further comprises passing the at least one document through a plurality of value type expression classifiers wherein each of the value type expression classifiers are configured to identify a particular type of comparative feature from natural language text expressions in the at least one document.

12. The method of claim 9 wherein determining further comprise evaluating a plurality of comparative features in the document; and
wherein outputting outputs the document as a result when the evaluation of a subset of the comparative features meets the input.

13. The method of claim 9 wherein the at least one comparative feature is a multi-conditional comparative feature.

14. The method of claim 9 wherein the input is at least one configuration of at least one monitored application.

* * * * *